Figures 1, 2, 3, 4, 5:
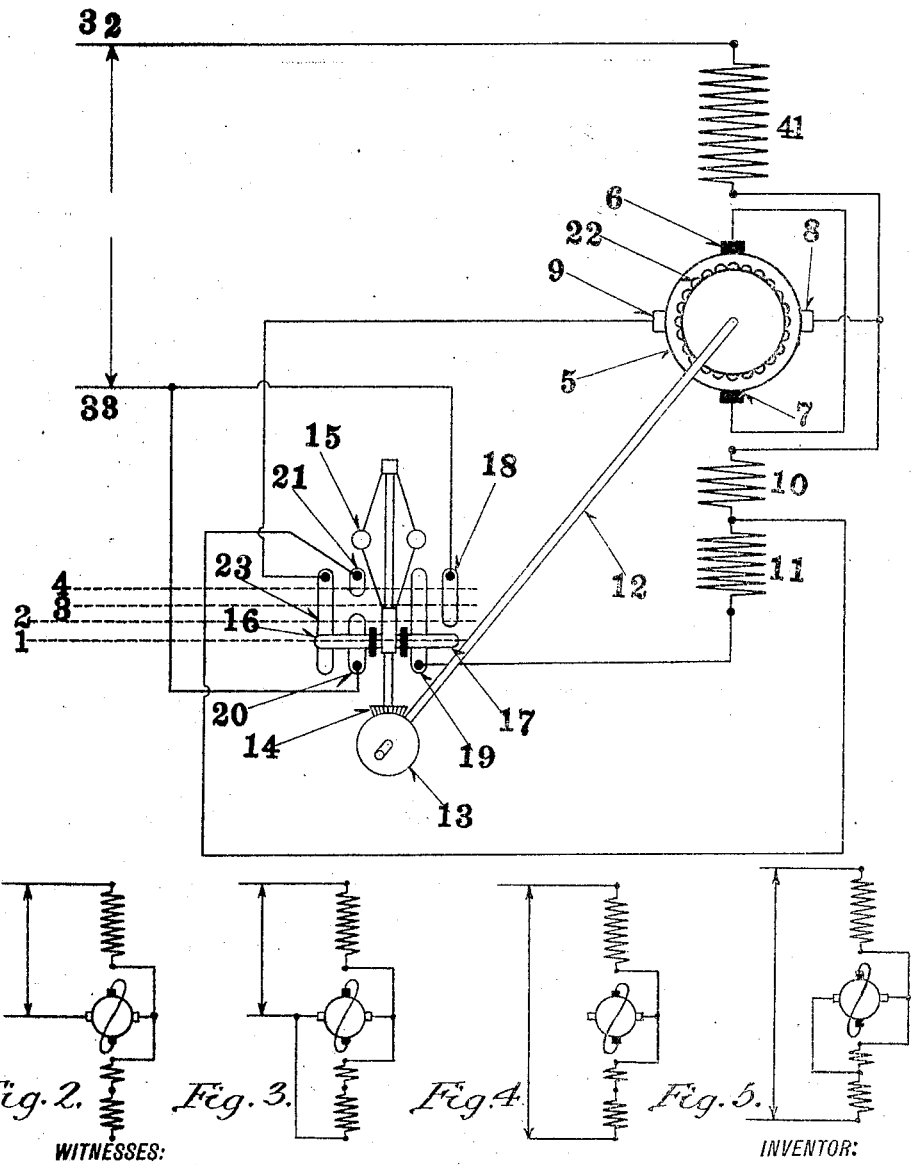

V. A. FYNN.
ALTERNATING CURRENT MOTOR.
APPLICATION FILED JULY 10, 1913.

1,101,069.

Patented June 23, 1914.

WITNESSES:
Chas. A. Becker
J. W. Shore

INVENTOR:
Valère A. Fynn.
BY
E. E. Huffman
ATTORNEY

UNITED STATES PATENT OFFICE.

VALÈRE ALFRED FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

ALTERNATING-CURRENT MOTOR.

1,101,069.

Specification of Letters Patent.   Patented June 23, 1914.

Application filed July 10, 1913. Serial No. 778,275.

*To all whom it may concern:*

Be it known that I, VALÈRE ALFRED FYNN, a subject of the King of England, residing at the city of St. Louis, State of Missouri, have invented a certain new and useful Alternating-Current Motor, of which the following is such a full, clear, and exact description as will enable any one skilled in the art to which it appertains to make and use the same, reference being had to the accompanying drawings, forming part of this specification.

My invention relates more particularly to constant speed alternate-current commutator motors with phase compensation, and its purpose is to enable the starting conditions to be chosen without regard to the running conditions and to so arrange the connections that it is possible to change the starting connections into the running connections without interrupting the circuit of the motor and without creating any short circuits.

My invention enables machines of the type referred to, to be designed for the best starting conditions and to be operated at the most suitable magnetic densities.

In carrying out my invention, I prefer to make use of a centrifugal switch for changing the connections after the motor has reached a certain speed.

My invention will be better understood by reference to Figure 1 of the accompanying drawings, which illustrates its application to a single-phase induction motor, the rotor of which carries a squirrel cage as well as a commuted winding. Figs. 2, 3, 4 and 5 show the connections for each position of the controlling switch.

The stator winding is carried out in the manner usual for single-phase motors but is provided with two taps, or it may be said to be divided into three parts, 41, 10 and 11, which are all connected in series and coaxially disposed. The rotor carries a commuted winding 5 and a squirrel cage winding 22, which is preferably separated from the former by more or less magnetic material. The commuted winding is short-circuited by means of the working brushes 6, 7, along the axis of the stator winding. It also coöperates with exciting brushes 8, 9, which are displaced by ninety electrical degrees from the working brushes. The brush 8 is connected to the stator winding between the groups 41 and 10 thereof. Brush 9 is connected to the stationary contact 23 forming part of the centrifugal switch. This switch is operated by the rotor by way of the shaft 12 and the wheels 13 and 14. The weights 15 of this switch control the sliding contacts 16, 17, coöperating with the stationary contacts 20, 21, 23 and 18, 19 respectively. One of the mains 32 is connected to one end of the stator winding 41, while the other main 33 is connected to the stationary contacts 20 and 18 of the centrifugal switch. A tap brought out between the parts 10 and 11 of the stator winding is connected to the contact 21, and the other end of part 11 of the stator winding is connected to the stationary contact 19.

The mode of operation of this improved machine is as follows: At starting, the moving contacts 16 and 17 of the centrifugal switch are in the position shown in the figure, which will be referred to as position 1, and bridge the stationary contacts 20 and 23, thus connecting the main 33 to the exciting brush 9; the circuit being completed through the commuted winding 5, the other exciting brush 8, and the part 41 of the stator winding. After the machine has reached a certain speed, the weights 15 cause the movable contacts 16 and 17 to travel upward and to occupy the position 2. In this position the connection between the stationary contacts 20 and 23 is maintained and contacts 18 and 19 are interconnected by means of the blade 17, thus connecting the main 33 to one end of the total stator winding while the main 32 remains connected to the other end of said winding. The closing of this circuit also closes a local circuit including the stator winding parts 10 and 11 and the commuted winding 5, by way of the brushes 9 and 8. A further upward motion of the blades 16, 17, controlled by the weights 15, brings the centrifugal switch in its third position and interrupts the connection between the stationary contacts 20 and 23, thus opening the local circuit just referred to. The final operation performed by the centrifugal switch, when it reaches its position 4, consists in bridging the stationary contacts 21 and 23, thus forming a local circuit including the commuted winding 5 by way of the brushes 8, 9, and the part 10 of the stator winding.

The number of turns of the part 41 of the stator winding is so chosen as to give the desired torque in combination with the selected commuted winding. The number of turns in the complete stator winding, including parts 41, 10 and 11, is chosen so as to give the most suitable working densities in the motor, while the number of turns in the part 10 of the stator winding is selected so as to produce the desired degree of compensation when that winding is connected to the exciting brushes after the motor has reached its normal speed. In the position 1 of the centrifugal switch, only part 41 of the stator winding is in circuit. In the second position of said switch, the whole of the stator winding is in circuit, but the compensating E. M. F. impressed on the exciting brushes 8, 9, is derived from the parts 10 and 11 of the stator winding. In the position 3 of the centrifugal switch, the preliminary compensating circuit is interrupted but the machine is kept running, the squirrel cage 22 producing the necessary motor field by rotation in the flux due to the stator windings 41, 10 and 11. In the final or fourth position of the centrifugal switch, the whole stator winding is still in circuit, but the normal compensating E. M. F. is impressed on the exciting brushes 8, 9, being derived from the part 10 of the stator winding. This part 10 may be chosen to produce any degree of phase compensation. In this manner the starting conditions are made quite independent of the running conditions and the motor may be operated in both cases under the most favorable circumstances.

Having fully described my invention, what I claim as new and desire to secure by Letters-Patent of the United States is:

1. The combination with a source of alternating current, of a motor having a stator provided with a main, a compensating and an auxiliary winding, all coaxially disposed, a rotor having a permanently short-circuited winding, a commuted winding, short-circuited working brushes in the axis of the stator windings and exciting brushes displaced therefrom, the main stator winding and exciting brushes being connected in series and to the source at starting, means for connecting the compensating and auxiliary stator windings to the source in series with the main winding and in shunt to the exciting brushes, and means for disconnecting the source from one exciting brush and for connecting the compensating winding in shunt to the exciting brushes.

2. The combination with a source of alternating current, of a motor having a stator provided with a main, a compensating and an auxiliary winding, all coaxially disposed, a rotor having a permanently short-circuited winding, a commuted winding, short-circuited working brushes in the axis of the stator windings and exciting brushes displaced therefrom, the main stator winding and the exciting brushes being connected in series and to the source at starting, means governed by the speed of the motor for connecting the compensating and auxiliary stator windings to the source in series with the main winding and in shunt to the exciting brushes, for disconnecting the source from one exciting brush, and for connecting the compensating winding in shunt to the exciting brushes.

In testimony whereof, I have hereunto set my hand and affixed my seal in the presence of two subscribing witnesses.

VALÈRE ALFRED FYNN. [L. S.]

Witnesses:
W. A. ALEXANDER,
G. M. SHORE.